(12) United States Patent
Taoka et al.

(10) Patent No.: US 8,787,261 B2
(45) Date of Patent: Jul. 22, 2014

(54) BASE STATION APPARATUS, MOBILE STATION APPARATUS AND TRANSMISSION POWER CONTROL METHOD

(75) Inventors: Hidekazu Taoka, Tokyo (JP); Yuichi Kakishima, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 196 days.

(21) Appl. No.: 13/498,918

(22) PCT Filed: Sep. 22, 2010

(86) PCT No.: PCT/JP2010/066416
§ 371 (c)(1),
(2), (4) Date: Apr. 20, 2012

(87) PCT Pub. No.: WO2011/043191
PCT Pub. Date: Apr. 14, 2011

(65) Prior Publication Data
US 2012/0195264 A1    Aug. 2, 2012

(30) Foreign Application Priority Data

Oct. 5, 2009  (JP) .................................. 2009-231924

(51) Int. Cl.
*H04W 4/00* (2009.01)

(52) U.S. Cl.
USPC .......................... 370/328; 455/562.1; 455/522

(58) Field of Classification Search
CPC ................... H04L 25/03949; H04W 52/03949
USPC .................................................. 370/328–338
See application file for complete search history.

(56) References Cited

U.S. PATENT DOCUMENTS

| | | | |
|---|---|---|---|
| 2008/0187062 A1* | 8/2008 | Pan et al. | 375/260 |
| 2008/0198946 A1* | 8/2008 | Lee et al. | 375/299 |
| 2010/0069122 A1* | 3/2010 | Ito | 455/562.1 |

FOREIGN PATENT DOCUMENTS

| | | |
|---|---|---|
| JP | 2008-125068 A | 5/2008 |
| JP | 2008-125069 A | 5/2008 |
| JP | 2008-136199 A | 6/2008 |
| WO | 2008/100038 A2 | 8/2008 |

OTHER PUBLICATIONS

International Search Report w/translation from PCT/JP2010/066416 dated Nov. 2, 2010 (4 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

* cited by examiner

*Primary Examiner* — Chi Pham
*Assistant Examiner* — Fahmida Chowdhury
(74) *Attorney, Agent, or Firm* — Osha Liang LLP

(57) ABSTRACT

To suppress deterioration of throughput characteristics in the entire system even when a plurality of transmission antennas is placed in an indoor environment, a base station apparatus (eNode B) is provided with a power control matrix generating section (508*b*) that generates a power control matrix (Sx) reflecting average reception power of each of transmission signals from a plurality of transmission antennas (TX#1 to TX#$N_{TX}$), a codebook update section (508*c*) that updates a codebook which beforehand defines a plurality of precoding weights corresponding to the power control matrix (Sx), a precoding weight selecting section (508*d*) that selects precoding weights that maximize throughput or reception SINR obtained after combining the transmission signals from the updated codebook, and a precoding multiplying section (transmission power control section) (507) that controls transmission power of each of the transmission signals corresponding to the selected precoding weights.

7 Claims, 6 Drawing Sheets

$$Sx = \begin{pmatrix} \sum_{t=t_0}^{t_0+TN_{RX}} \sum_{j=1}^{} |r_{N_1 j}(t)|^2 & 0 & \cdots & 0 \\ 0 & \sum_{t=t_0}^{t_0+TN_{RX}} \sum_{j=1}^{} |r_{N_2 j}(t)|^2 & \cdots & 0 \\ \vdots & \vdots & \ddots & \vdots \\ 0 & 0 & \cdots & \sum_{t=t_0}^{t_0+TN_{RX}} \sum_{j=1}^{} |r_{N_{TX} j}(t)|^2 \end{pmatrix}$$

$S_X$ : POWER CONTROL MATRIX
$t_0$ : AVERAGING INITIAL TIME
$T$ : AVERAGING TIME
$N_{TX}$ : THE NUMBER OF TRANSMISSION ANTENNAS
$N_{RX}$ : THE NUMBER OF RECEPTION ANTENNAS
$r_{ij}(t)$ : RECEPTION SIGNAL POWER BETWEEN TRANSMISSION ANTENNA i AND RECEPTION ANTENNA j $$Sx = \begin{pmatrix} \sum_{t=t_0}^{t_0+T} \sum_{j=1}^{N_{RX}} |r_{N_1 j}(t)|^2 & 0 & \cdots & 0 \\ 0 & \sum_{t=t_0}^{t_0+T} \sum_{j=1}^{N_{RX}} |r_{N_2 j}(t)|^2 & \cdots & 0 \\ \vdots & \vdots & \ddots & \vdots \\ 0 & 0 & \cdots & \sum_{t=t_0}^{t_0+T} \sum_{j=1}^{N_{RX}} |r_{N_{TX} j}(t)|^2 \end{pmatrix}$$

$S_X$ : POWER CONTROL MATRIX
$t_0$ : AVERAGING INITIAL TIME
$T$ : AVERAGING TIME
$N_{TX}$ : THE NUMBER OF TRANSMISSION ANTENNAS
$N_{RX}$ : THE NUMBER OF RECEPTION ANTENNAS
$r_{ij}(t)$ : RECEPTION SIGNAL POWER BETWEEN TRANSMISSION ANTENNA i AND RECEPTION ANTENNA j

FIG.3

BASE STATION APPARATUS, MOBILE STATION APPARATUS AND TRANSMISSION POWER CONTROL METHOD

TECHNICAL FIELD

The present invention relates to a base station apparatus, mobile station apparatus and transmission power control method, and more particularly, to a base station apparatus, mobile station apparatus and transmission power control method that support downlink multi-antenna transmission.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been discussed (for example, LTE Advanced (LTE-A)). For example, in LTE-A, it is scheduled to extend 20 MHz that is the maximum system band in LTE specifications to about 100 MHz.

Further, in the LTE-scheme system, the MIMO (Multi Input Multi Output) antenna system is proposed, as radio communication techniques for transmitting and receiving data with a plurality of antennas, and improving throughput and spectral efficiency (for example, see Non-patent Document 1). In the LTE-scheme system, the spatial multiplexing transmission mode (SU-MIMO (Single User MIMO)) is specified as a downlink MIMO mode. The spatial multiplexing transmission mode is a mode for spatially multiplexing signals of a plurality of streams in the same frequency and time to transmit, and is effective in improving throughput. In the LTE-scheme system, it is possible to transmit different transmission signals from maximum four transmission antennas in parallel to spatially multiplex. In LTE-A, it is scheduled to increase the maximum number (4) of transmission antennas in LTE specifications to "8".

In the case of using such a spatial multiplexing transmission mode in an indoor environment, for example, it is conceivable that a plurality of transmission antennas is distributed and placed (Distributed placement) in a certain space. In the LTE-A-scheme system, maximum eight transmission antennas are distributed and placed, transmission signals of a plurality of streams are spatially multiplexed and transmitted from each of the transmission antennas, while the mobile station apparatus side properly divides such transmission signals of a plurality of streams to obtain a reception signal, and it is thereby possible to improve throughput.

CITATION LIST

Non-Patent Literature

[Non-patent Literature 1] 3GPP TR 25.913 "Requirements for Evolved UTRA and Evolved UTRAN"

SUMMARY OF INVENTION

Technical Problem

However, when a plurality of transmission antennas is distributed and placed in a certain space as described above, since the distance from each transmission antenna varies corresponding to the position of a mobile station apparatus, and therefore, a difference occurs in an attenuation amount (path loss) of a transmission signal. In a state in which the difference thus occurs in the path loss of the transmission signal, such a situation is expected that performance in the spatial multiplexing transmission mode is not exerted sufficiently, and that throughput characteristics in the entire system deteriorate.

An object of the present invention is made in view of such circumstances, and is to provide a base station apparatus, mobile station apparatus and transmission power control method that enable deterioration of throughput characteristics in the entire system to be suppressed even when a plurality of transmission antennas is placed in an indoor environment.

Solution to the Problem

A base station apparatus of the invention is characterized by having a power control matrix generating section configured to generate a power control matrix reflecting average reception power of each of transmission signals from a plurality of transmission antennas, an update section configured to update a codebook which beforehand defines a plurality of precoding weights corresponding to the power control matrix, a selecting section that selects precoding weights that maximize throughput or reception SINR obtained after combining the transmission signals from the updated codebook, and a transmission power control section configured to control transmission power of each of the transmission signals corresponding to the precoding weights selected in the selecting section.

According to this configuration, since transmission power of each transmission signal is determined corresponding to average reception power of the transmission signal from each of transmission antennas, it is possible to control transmission power of each transmission signal flexibly while reflecting the average reception power of the transmission signal from each of the transmission antennas, it is thereby made possible to perform, for example, transmission power control for increasing transmission power of a transmission signal with a small path loss, transmission power control for increasing transmission power of a transmission signal with a large path loss, etc., and therefore, even in the case where a plurality of transmission antennas is placed in an indoor environment, it is possible to suppress deterioration of throughput characteristics in the entire system.

A mobile station apparatus of the invention is characterized by having an average reception power measuring section configured to measure average reception power of each of transmission signals from a plurality of transmission antennas of a base station apparatus, a power control matrix generating section configured to generate a power control matrix reflecting the average reception power, an update section configured to update a codebook which beforehand defines a plurality of precoding weights corresponding to the power control matrix, a selecting section configured to select precoding weights that maximize throughput or reception SINR obtained after combining the transmission signals from the updated codebook, and a transmission section configured to transmit, to the base station apparatus, information on the average reception power measured in the average reception power measuring section and on the precoding weights selected in the selecting section.

According to this configuration, the precoding weights that maximize throughput or reception SINR obtained after combining the transmission signals are selected based on the average reception power of the transmission signal from each of transmission antennas of the base station apparatus, the information on the precoding weights is transmitted to the base station apparatus, it is thereby possible to provide the information on the precoding weights reflecting the average reception power of the transmission signal from each of the transmission antennas to the base station apparatus, and it is thus possible to simplify the processing in controlling transmission power of each transmission signal in the base station apparatus.

Technical Advantageous of the Invention

According to the invention, since transmission power of each transmission signal is determined corresponding to average reception power of the transmission signal from each of transmission antennas, it is possible to control transmission power of each transmission signal flexibly while reflecting the average reception power of the transmission signal from each of the transmission antennas, it is thereby made possible to perform, for example, transmission power control for increasing transmission power of a transmission signal with a small path loss, transmission power control for increasing transmission power of a transmission signal with a large path loss, etc., and therefore, even in the case where a plurality of transmission antennas is placed in an indoor environment, it is possible to suppress deterioration of throughput characteristics in the entire system.

BRIEF DESCRIPTION OF DRAWINGS

FIG. 3 is a diagram showing an example of a power control matrix used in precoding determining sections of the base station apparatus and the mobile station apparatus according to the invention;

DESCRIPTION OF EMBODIMENTS

An Embodiment of the invention will specifically be described below with reference to accompanying drawings.

In addition, in the following descriptions, described is the case where the invention is embodied in a base station apparatus, mobile station apparatus and mobile communication system, but the invention is not limited thereto, and is established as a transmission power control method in a base station apparatus.

Figure 1:
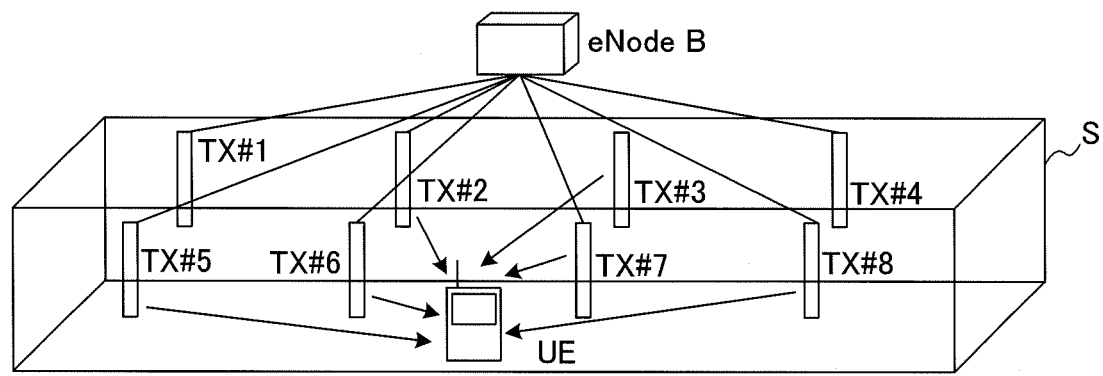
FIG. 1 is a diagram to explain an example of an application environment of a base station apparatus and a mobile station apparatus according to the invention.

Described first is an application environment of a base station apparatus eNode B and mobile station apparatus UE according to the invention. FIG. 1 is a diagram to explain an example of the application environment of the base station apparatus eNode B and the mobile station apparatus UE according to the invention. In addition, FIG. 1 shows the case where the base station apparatus eNode B is of LTE-A specifications and has eight transmission antennas, but the configuration of the base station apparatus eNode B is not limited thereto, and is capable of being changed as appropriate. For example, it is possible to apply to a base station apparatus eNode B of LTE specifications with four transmission antennas.

As shown in FIG. 1, the base station apparatus eNode B according to the invention is provided with eight transmission antennas TX#1 to TX#8, and is capable of performing SU-MIMO transmission (spatial multiplexing transmission) in downlink using the transmission antennas TX#1 to TX#8. These transmission antennas TX#1 to TX#8 are distributed and placed in an indoor environment comprised of space S. More specifically, four antennas are placed at equal intervals on each of a pair of wall surfaces in the longitudinal direction of the spaces. The mobile station apparatus UE is positioned inside the space S, and is capable of dividing transmission signals from these transmission antennas TX#1 to TX#8 to obtain the reception signal.

When a plurality of transmission antennas TX#1 to TX#8 is distributed and placed in the spaces, since the distance between each of the transmission antennas TX#1 to TX#8 and the mobile station apparatus UE varies corresponding to the position of the mobile station apparatus UE, a difference occurs in an attenuation amount (path loss) of the transmission signal. For example, as shown in FIG. 1, when the mobile station apparatus UE is positioned near the center at one wall surface in the longitudinal direction in the space S, the distance from the transmission antenna TX#4 is longer than the distance from the transmission antenna TX#6, and therefore, the path loss of a transmission signal from the transmission antenna TX#4 is larger than the path loss of a transmission signal from the transmission antenna TX#6. In this case, the mobile station apparatus UE side is not able to obtain the transmission signal from the transmission antenna TX#4, and throughput characteristics in the entire system deteriorate. Further, the transmission signal with the large path loss does not sufficiently contribute to information transmission to the mobile station apparatus UE that is a reception target, while becoming a cause of interference in an adjacent cell. In this case, such a situation occurs that a mobile station apparatus UE positioned in the adjacent cell does not obtain a reception signal properly, and throughput characteristics deteriorate in the cell. The path loss of a transmission signal is related to transmission power from each transmission antenna, and the inventors of the invention found out that controlling transmission power from each transmission antenna corresponding to the path loss of the transmission signal is effective in suppressing deterioration of throughput characteristics.

The inventors of the invention noted the aforementioned respect, and arrived at the invention to suppress deterioration of throughput characteristics caused by differences in the path loss occurring among transmission signals by controlling transmission power from each transmission antenna. In other words, it is the gist of the invention to update a codebook that beforehand defines a plurality of precoding weights with a power control matrix reflecting average reception power of each of transmission signals from a plurality of transmission antennas of the base station apparatus, select precoding weights that maximize throughput or reception SINR obtained after combining the transmission signals from the updated codebook, and control transmission power of each transmission signal corresponding to the selected precoding weights.

Figure 2:
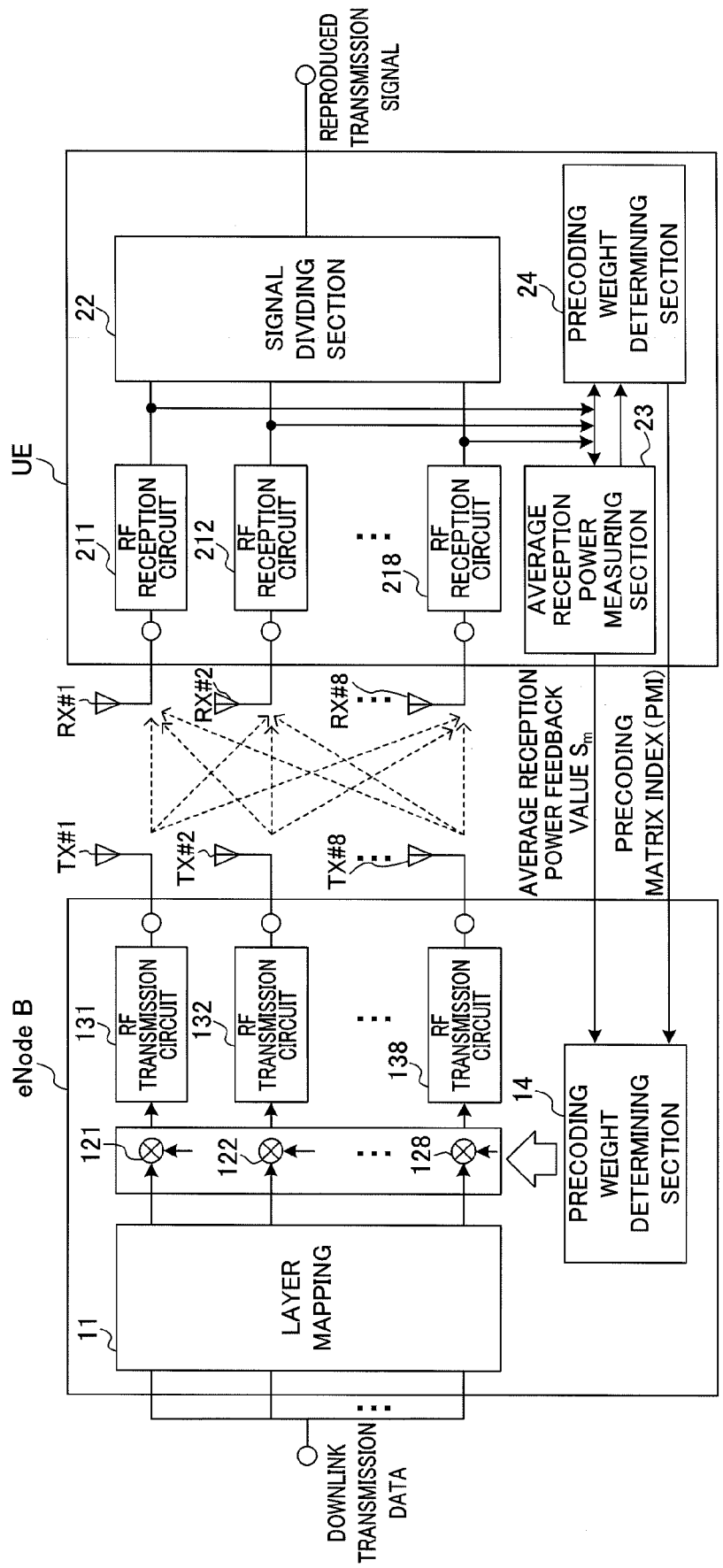
FIG. 2 is a conceptual diagram of a MIMO system comprised of the base station apparatus and the mobile station apparatus according to the invention.

FIG. 2 is a conceptual diagram of a MIMO system comprised of the base station apparatus eNode B and the mobile station apparatus UE according to the invention. In the MIMO system as shown in FIG. 2, the base station apparatus eNode B includes a layer mapping section 11 that allocates downlink transmission data to the number of transmission layers (the number of streams), 8-system multipliers 121 to 128 and radio frequency (RF) transmission circuits 131 to 138 associated with eight transmission antennas TX#1 to TX#8, and a precoding weight determining section 14 that determines precoding weights (phase/amplitude control amounts) based on an average reception power feedback value Sm and precoding matrix index (PMI: Precoding Matrix Indicator) notified from the mobile station apparatus UE, and is comprised.

When downlink transmission data is input, the layer mapping section 11 allocates the data to the number of transmission layers indicated from an upper station apparatus. Subsequently, the multipliers 121 to 128 multiply the transmission data by precoding weights, and each of the phase and amplitude is controlled (shifted). Then, the phase/amplitude shifted transmission data is subjected to frequency conversion processing for converting into the radio frequency band in the RF transmission circuits 131 to 138, and is transmitted from eight transmission antennas TX#1 to TX#8 as transmission signals.

The precoding weight determining section 14 determines optimal precoding weights that maximize throughput (or reception SINR) obtained after combining the transmission signals from respective transmission antennas TX#1 to TX#8, based on the average reception power feedback value Sm indicative of average reception power of each of transmission signals from transmission antennas TX#1 to TX#8 and the PMI which are notified from the mobile station apparatus UE, and provides the precoding weights to the multipliers 121 to 128. In other words, the base station apparatus eNode B transmits, to the mobile station apparatus UE, transmission signals with the phase and amplitude shifted while reflecting the average reception power of each of transmission signals from transmission antennas TX#1 to TX#8 and the PMI.

The precoding weight determining section 14 is provided with a codebook (hereinafter, referred to as a "base codebook") that defines N precoding weights which are known in both the base station apparatus eNode B and the mobile station apparatus UE, and updates the base codebook (more specifically, precoding weights defined in the base codebook) using the transmission power control matrix (hereinafter, referred to as a "power control matrix") Sx generated corresponding to the average reception power feedback value Sm. Then, among the precoding weights defined in the updated codebook (hereinafter, referred to as an "updated codebook"), the section selects optimal weights corresponding to the PMI notified from a precoding weight determining section 24. In addition, the configuration of the power control matrix Sx used in updating the base codebook will be described later.

Meanwhile, the mobile station apparatus UE includes 8-system radio frequency (RF) reception circuits 211 to 218 associated with eight reception antennas RX#1 to RX#8, a signal dividing section 22 that divides reception signals received in the RF reception circuits 211 to 218, an average reception power measuring section 23 that measures average reception power of a transmission signal from each of the transmission antennas TX#1 to TX#8 of the base station eNode B from a reference signal included in the reception signal, and the precoding weight determining section 24 that determines precoding weights (phase/amplitude control amounts), based on the average reception power measured in the average reception power measuring section 23 and on the reference signal included in the reception signal, and is comprised.

Reception signals input via the reception antennas RX#1 to RX#8 are subjected to frequency conversion processing for converting a radio frequency signal into a baseband signal in the RF reception circuits 211 to 218. The reception signal converted into the baseband signal is divided into reception signals associated with respective streams in the signal dividing section 22. Then, the reception signal associated with each stream is subjected to data demodulation processing and channel decoding processing, and the downlink transmission data is thereby reproduced.

The average reception power measuring section 23 measures average reception power in each of the reception antennas RX#1 to RX#8 corresponding to the reference signal included in the reception signal, and notifies the precoding weight determining section 24 and the precoding weight determining section 14 of the base station apparatus eNode B of the measured average reception power as an average reception power feedback value Sm. In measurement of the average reception power, for example, used is a channel state information-reference signal (CSI-RS) specified in LTE-A, but the invention is not limited thereto, and it is also possible to use a cell-specific reference signal specified in LTE.

The precoding weight determining section 24 determines optimal precoding weights that maximize throughput (or reception SINR) obtained after combining transmission signals from respective transmission antennas TX#1 to TX#8 of the base station apparatus eNode B, based on the average reception power feedback value Sm notified from the average reception power measuring section 23, and on the reference signal (for example, CSI-RS) included in the reception signal, and notifies the precoding weight determining section 14 of the base station apparatus eNode B of a PMI corresponding to the precoding weights.

As in the precoding weight determining section 14 of the base station apparatus eNode B, the precoding weight determining section 24 is provided with the base codebook that defines N precoding weights which are known in both the base station apparatus eNode B and the mobile station apparatus UE, and updates the precoding weights defined in the base codebook corresponding to a power control matrix Sx that is generated corresponding to the average reception power feedback value Sm. Then, among the precoding weights defined in the updated codebook, the section selects optimal precoding weights corresponding to the reference signal included in the reception signal. Subsequently, the precoding weight determining section 24 notifies the precoding weight determining section 14 of the PMI corresponding to the selected precoding weights.

In addition, in the precoding weight determining section 24, since both the base station apparatus eNode B and the mobile station apparatus UE are provided with the known base codebook, it is possible to notify the selected precoding weights only by notifying the PMI. The PMI constitutes information on the optimal precoding weights determined in the precoding weight determining section 24. Further, the precoding weight determining section 14 and the precoding weight determining section 24 are provided with the common base codebook, and since the power control matrix Sx is generated corresponding to the average reception power feedback value Sm, are capable of obtaining the same power control matrix Sx. Then, the base codebook is updated using the power control matrix Sx, and therefore, the sections are capable of obtaining the same updated codebook.

Herein, described is the power control matrix Sx used by the precoding weight determining section 14 and the precoding weight determining section 24 in updating the base code. FIG. 3 is a diagram to explain the power control matrix Sx used in the precoding weight determining section 14 of the base station apparatus eNode B and the precoding weight determining section 24 of the mobile station apparatus UE according to the invention.

As shown in FIG. 3, the power control matrix Sx is comprised of a diagonal matrix (herein, the eighth-order diagonal matrix) having the dimension of the number of transmission antennas of the base station apparatus eNode B (the number of reception antennas of the mobile station apparatus UE). Further, the power control matrix Sx has average reception power values of transmission signals from respective transmission antennas TX#1 to TX#8 in diagonal components of matrix elements, and further has "o" components in the other matrix elements. In addition, in the power control matrix Sx shown in FIG. 3, "$t_0$" represents the averaging initial time, "T" represents the averaging time, "$N_{TX}$" represents the number of transmission antennas, "$N_{RX}$" represents the number of reception antennas, and "$r_{ij}(t)$" represents reception signal power between a transmission antenna i and a reception antenna j.

In the base codebook held in the base station apparatus eNode B provided with eight transmission antennas TX#1 to TX#8 as shown in FIG. 2, for example, it is considered that 16 to 32 precoding weights are prepared for each 1 to 8 layer transmission, and these weights are defined as the matrix elements. In addition, the number of precoding weights defined in the base codebook is not limited particularly, and is capable of being changed as appropriate. The precoding weights (precoding matrix) defined in such a base codebook are updated using the above-mentioned power control matrix Sx. More specifically, the base codebook is updated by multiplying the precoding weights defined in the base codebook by the square root of the power control matrix Sx.

By thus updating the precoding weights defined in the base codebook, the average reception power value of the transmission signal from each of the transmission antennas TX#1 to TX#8 is reflected in the updated precoding weights. More specifically, transmission power is decreased in a transmission signal with the average reception power value from each of the transmission antennas TX#1 to TX#8 being relatively low (i.e. transmission signal with a large path loss), while transmission power is increased in a transmission signal with the average reception power value from each of the transmission antennas TX#1 to TX#8 being relatively high (i.e. transmission signal with a small path loss). By this means, high transmission power is assigned to the transmission signal from the transmission antenna with a small path loss, as compared with the transmission signal from the transmission antenna with a large path loss, it is thereby possible to reliably transmit the transmission signal from the transmission antenna with a small path loss to the mobile station apparatus UE, it is thus possible to perform signal transmission more efficiently as compared with the case where the difference occurs in the path loss corresponding to the distance between each of the transmission antennas TX#1 to TX#8 and the mobile station apparatus UE, and it is possible to suppress deterioration of throughput characteristics in the entire system.

Further, in this case, since transmission power is decreased in the transmission signal from the transmission antenna with a large path loss, it is possible to reduce the effect that the transmission signal exerts on an adjacent cell as an interfering signal, it is possible to make the situation, in which throughput characteristics deteriorate in the cell, hard to occur, and it is possible to suppress deterioration of throughput characteristics in the entire system.

In addition, in the power control matrix Sx as shown in FIG. 3, the case is shown where the matrix has average reception power values as diagonal components of matrix elements, but the diagonal components of matrix elements are not limited to the average reception power values. For example, other than the average reception power values, there may be the reciprocal (hereinafter, simply referred to as "the reciprocal of the path loss") of the path loss of the transmission signal from each of the transmission antennas TX#1 to TX#8 and values in proportion thereto. For example, it is possible to estimate the reciprocal of the path loss from the ratio between the above-mentioned average reception power value and the transmission power value in each of the transmission antennas TX#1 to TX#8. The precoding weight determining sections 14 and 24 generate a power control matrix Sx including such reciprocals of path losses in matrix elements based on the average reception power feedback value Sm, and update precoding weights defined in the base codebook using the power control matrix Sx.

In the case of thus updating the base codebook using the power control matrix Sx including the reciprocals of path losses in the diagonal components of matrix elements, contrary to the power control matrix Sx including the average reception power in the diagonal components of matrix elements, transmission power is increased in a transmission signal with the average reception power value from each of the transmission antennas TX#1 to TX#8 being relatively low (i.e. transmission signal with a large path loss), while transmission power is decreased in a transmission signal with the average reception power value from each of the transmission antennas TX#1 to TX#8 being relatively high (i.e. transmission signal with a small path loss). By this means, adjustments are made so that transmission power allocated to the transmission signal from the transmission antenna with a small path loss is substantially equal to transmission power allocated to the transmission signal from the transmission antenna with a large path loss, it is thereby possible to make the situation, in which the mobile station apparatus UE side is not able to obtain the transmission signal from the transmission antenna with a large path loss, hard to occur, it is thus possible to perform signal transmission more efficiently as compared with the case where the difference occurs in the path loss corresponding to the distance between each of the transmission antennas TX#1 to TX#8 and the mobile station apparatus UE, and it is possible to suppress deterioration of throughput characteristics in the entire system.

In addition, it is preferable whether the power control matrix Sx has average reception power values or the reciprocals of path losses as diagonal components of matrix elements is selected corresponding to an environment to which is applied the MIMO system according to this Embodiment, and placing importance on which throughput (for example, peak throughput or cell-edge throughput).

Figure 4:
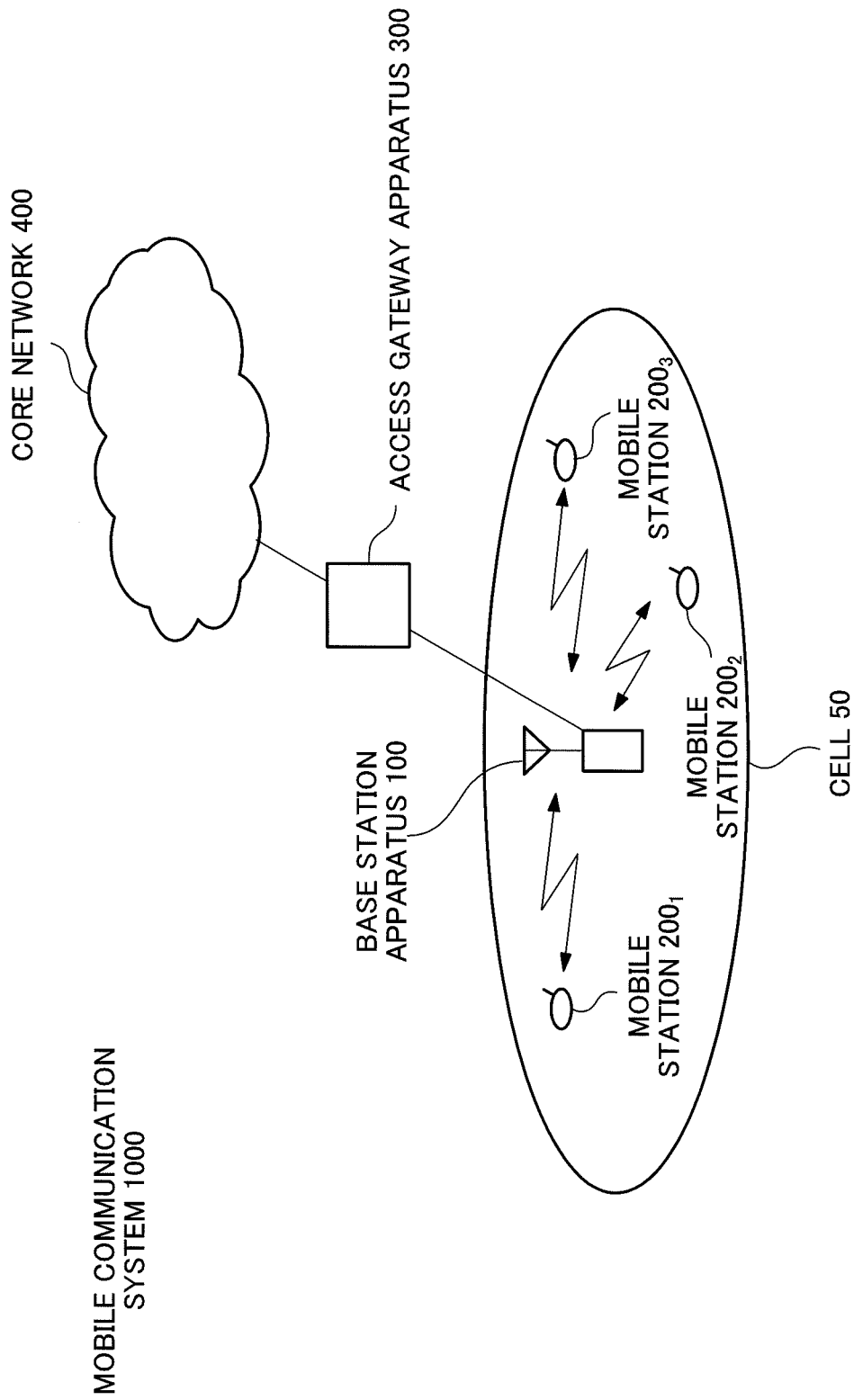
FIG. 4 is a network configuration diagram of a mobile communication system to which are applied the base station apparatus and the mobile station apparatus according to an Embodiment.

Described below is the configuration of the mobile communication system having the base station apparatus eNode B and the mobile station apparatus UE according to this Embodiment. FIG. 4 is a network configuration diagram of the mobile communication system to which are applied the base station apparatus eNode B and the mobile station apparatus UE according to this Embodiment.

The mobile communication system 1000 is a system to which, for example, LTE (Long Term Evolution)-Advanced is applied. The mobile communication system 1000 is provided with a base station apparatus 100 and a plurality of mobile station apparatuses 200 ($200_1$, $200_2$, $200_3$, ..., $200_n$, n is an integer where n>0) that communicate with the base station apparatus 100. The base station apparatus 100 is connected to an upper station apparatus, for example, an access gateway apparatus 300, and the access gateway apparatus 300 is connected to a core network 400. The mobile station apparatus 200 communicates with the base station apparatus 100 in a cell 50 by LTE-Advanced. In addition, the access gateway apparatus 300 may be called the MME/SGW (Mobility Management Entity/Serving Gateway).

Each of the mobile station apparatuses $200_1$, $200_2$, $200_3$, ..., $200_n$ has the same configuration, function and state, and is described as a mobile station apparatus 200 unless otherwise specified in the following description. Further, for convenience in description, equipment that performs radio communication with the base station apparatus 100 is the mobile station apparatus 200, and more generally, the equipment may be user equipment (UE) including mobile terminals such as cellular telephone apparatuses and fixed terminals such as personal computers.

In the mobile communication system 1000, as a radio access scheme, radio access based on OFDMA (Orthogonal Frequency Division Multiplexing Access) is applied in downlink, while radio access based on SC-FDMA (Single-Carrier Frequency Division Multiple Access) is applied in uplink. Herein, OFDMA is a multicarrier transmission system for dividing a frequency band into a plurality of narrow frequency bands (subcarriers), and mapping data to each subcarrier to perform communication. SC-FDMA is a single-carrier transmission system for dividing the system band into bands comprised of a single or consecutive resource blocks for each terminal so that a plurality of terminals uses mutually different bands, and thereby reducing interference among the terminals.

Described herein are communication channels in LTE-Advanced. In downlink, used are the Physical Downlink Shared Channel (PDSCH) shared among the mobile station apparatuses 200, and the Physical Downlink Control Channel (PDCCH: also called the downlink L1/L2 control channel) that is a control channel in downlink. User data i.e. normal data signals are transmitted on the aforementioned Physical Downlink Shared Channel.

Further, in downlink, broadcast channels such as the Physical-Broadcast Channel (P-BCH) and Dynamic Broadcast Channel (D-BCH) are transmitted. Information transmitted on the P-BCH is Master Information Block (MIB), and information transmitted on the D-BCH is System Information Block (SIB). The D-BCH is mapped to the PDSCH, and is transmitted from the base station apparatus 100 to the mobile station apparatus 200n.

In uplink, used are the Physical Uplink Shared Channel (PUSCH) shared among the mobile station apparatuses 200, and the Physical Uplink Control Channel (PUCCH) that is a control channel in uplink. User data i.e. normal data signals are transmitted on the Physical Uplink Shared Channel. Meanwhile, on the Physical Uplink Control Channel are transmitted a precoding matrix index (PMI) for downlink MIMO transmission, average reception power feedback value Sm, acknowledgement/negative acknowledgment in response to the downlink shared channel, downlink channel state information (CSI: Channel State Information), etc. In addition, the PMI and average reception power feedback value Sm may be transmitted on the Physical Uplink Shared Channel (PUSCH).

In addition, in uplink, the Physical Random Access Channel is defined for initial connection and the like. The mobile station apparatus 200 transmits a random access preamble to the base station apparatus 100 on the PRACH.

Figure 5:
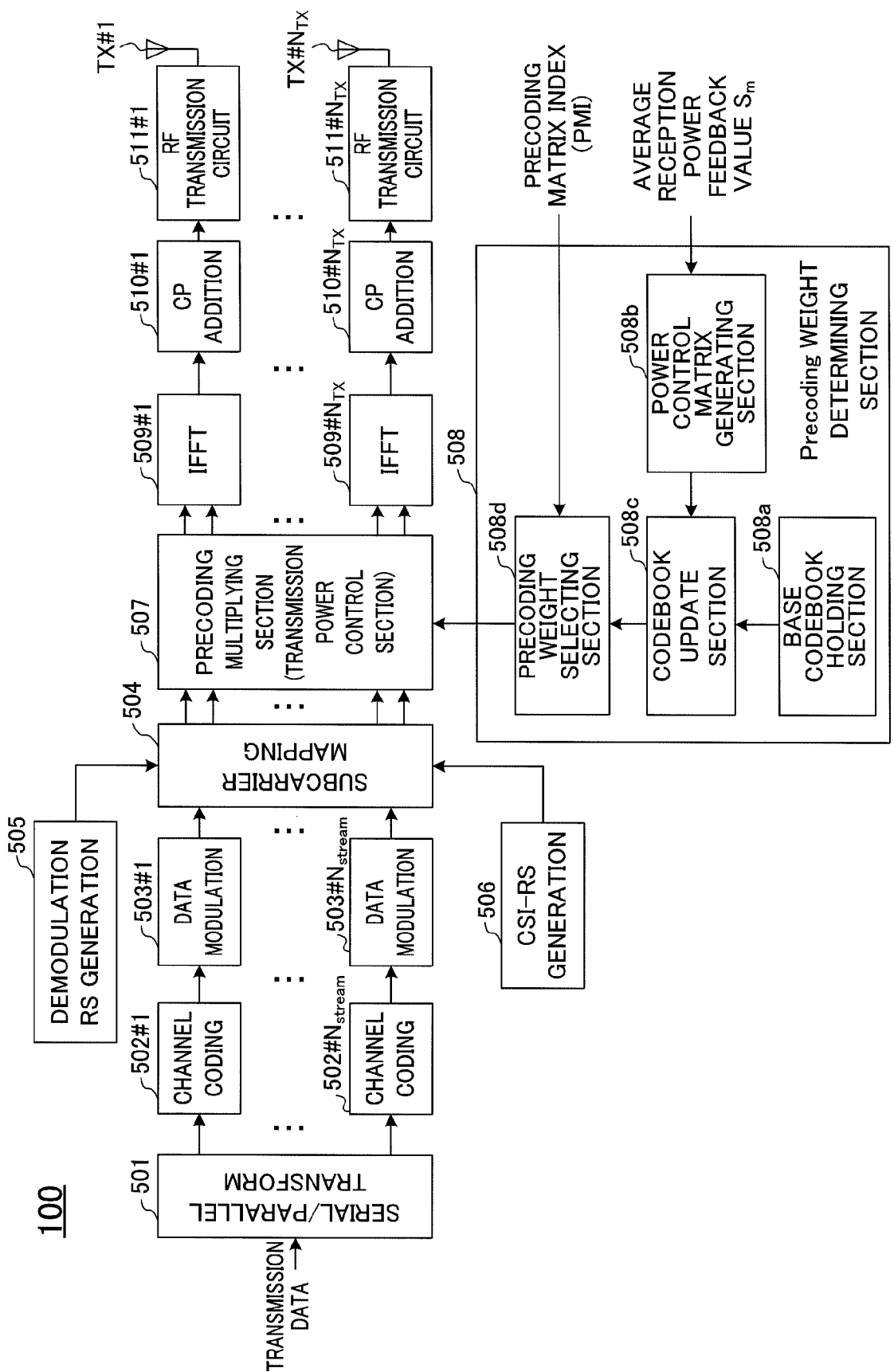
FIG. 5 is a block diagram illustrating a configuration of the base station apparatus according to the Embodiment.
Figure 6:
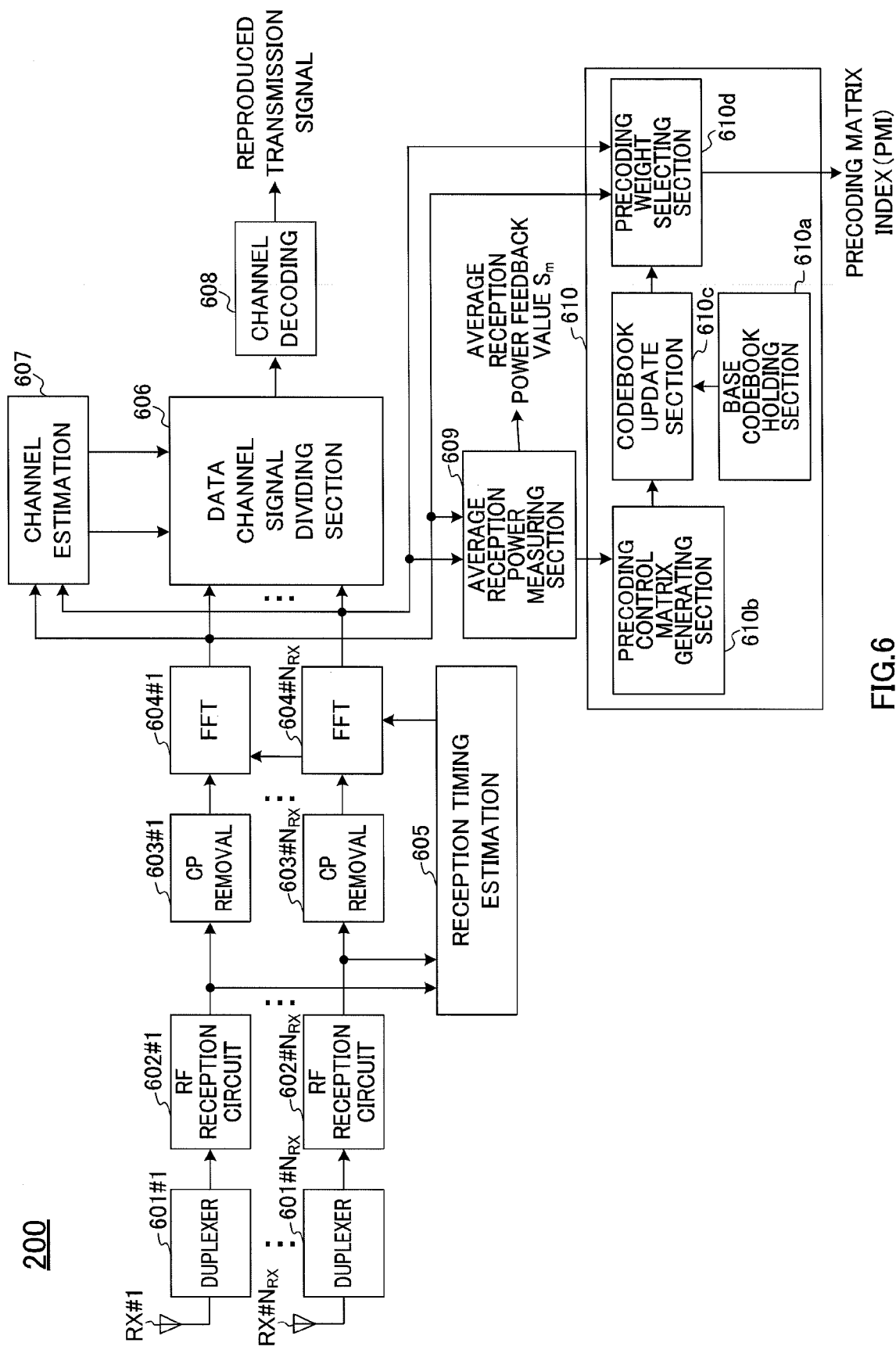
FIG. 6 is a block diagram illustrating a configuration of the mobile station apparatus according to the Embodiment.

FIG. 5 is a block diagram illustrating a configuration of the base station apparatus 100 according to this Embodiment. FIG. 6 is a block diagram illustrating a configuration of the mobile station apparatus 200 according to this Embodiment. In addition, the configurations of the base station apparatus 100 and the mobile station apparatus 200 as shown in FIGS. 5 and 6 are simplified to explain the invention, and are assumed to have the configurations that a normal base station apparatus and mobile station apparatus have, respectively.

In the base station apparatus 100 as shown in FIG. 5, a layer mapping section, not shown, allocates the transmission data to the number of transmission layers (the number of streams) indicated from the upper station apparatus to input to a serial/parallel transform section 501. The transmission data associated with respective streams are subjected to serial/parallel transform processing in the serial/parallel transform section 501, and then, subjected to channel coding and data modulation in channel coding sections 502#1 to 502#$N_{stream}$ and data modulation sections 503#1 to 503#$N_{stream}$, respectively. The transmission data subjected to data modulation in the data modulation sections 503#1 to 503#$N_{stream}$ is subjected to inverse Fourier transform in a discrete Fourier transform section not shown, and the time-series signal is thereby transformed into the signal in the frequency domain, and is output to a subcarrier mapping section 504.

The subcarrier mapping section 504 maps the transmission data associated with respective streams processed in the channel coding sections 502#1 to 502#$N_{stream}$ and data modulation sections 503#1 to 503#$N_{stream}$ to subcarriers corresponding to scheduling information provided from a scheduler, not shown. At this point, the subcarrier mapping section 504 maps (multiplexes) a demodulation reference signal (for example, DM-RS) generated in a demodulation reference signal (RS) generating section 505 and CSI-RS generated in a channel state information reference signal (CSI-RS) generating section 506 to subcarriers together with the transmission data. The transmission data thus mapped to subcarriers is input to a precoding multiplying section 507.

Herein, the CSI-RS functions as a reference signal to measure average reception power from each of the transmission antennas TX#1 to TX#8 in the mobile station apparatus 200. The CSI-RS is transmitted with certain transmission power without undergoing the effect of the above-mentioned power control matrix Sx. By thus transmitting the CSI-RS with certain transmission power, it is possible to enhance accuracy in measuring the average reception power in the mobile station apparatus 200. In addition, the CSI-RS is also used in selecting the PMI in the mobile station apparatus 200.

The precoding multiplying section 507 functions as a transmission power control section, and shifts the phase and/or amplitude of the transmission signal for each of the transmission antennas TX#1 to TX#8, based on precoding weights provided from a precoding weight determining section 508, described later (weighting of the transmission antennas TX#1 to TX#8 by precoding). For example, when the precoding multiplying section 507 is given precoding weights selected from the updated codebook updated by the power control matrix Sx including average reception power values in matrix elements, the section 507 performs transmission power control for decreasing transmission power of a transmission signal with the average reception power being relatively low (i.e. transmission signal with a large path loss), while increasing transmission power of a transmission signal with the average reception power being relatively high (i.e. transmission signal with a small path loss). Meanwhile, when the precoding multiplying section 507 is given precoding weights selected from the updated codebook updated by the power control matrix Sx including the reciprocals of path losses in matrix elements, the section 507 performs transmission power control for increasing transmission power of a transmission signal with the average reception power being relatively low (i.e. transmission signal with a large path loss), while decreasing transmission power of a transmission signal with the average reception power being relatively high (i.e. transmission signal with a small path loss).

In addition, for example, in the case of using the power control matrix Sx including average reception power values in matrix elements, as a result of decreasing transmission power of a transmission signal with the average reception power being relatively low (i.e. transmission signal with a large path loss), when the transmission power falls below a beforehand determined transmission power threshold, it is preferable as an Embodiment to set the transmission power at "0" to restrict transmission of the transmission signal. In this case, since "0" is set on the transmission power of the transmission signal from the transmission antenna with a large path loss, it is possible to eliminate the effect that the transmission signal exerts on an adjacent cell as an interfering signal, it is thereby possible to make the situation, in which throughput characteristics deteriorate in the cell, hard to occur, and it is possible to suppress deterioration of throughput characteristics in the entire system.

The precoding weight determining section 508 is provided with a base codebook holding section 508a that holds the base codebook, a power control matrix generating section 508b that generates the power control matrix Sx corresponding to the average reception power feedback value Sm notified from the mobile station apparatus 200, a codebook update section 508c that updates precoding weights defined in the base codebook corresponding to the power control matrix Sx, and a precoding weight selecting section 508d that selects optimal weights from among precoding weights defined in the codebook (updated codebook) updated corresponding to the PMI notified from the mobile station apparatus 200.

In the precoding weight determining section 508, upon receiving feedback of the average reception power feedback value Sm and PMI from the mobile station apparatus 200 in uplink, the power control matrix generating section 508b generates the above-mentioned power control matrix Sx based on the average reception power feedback value Sm. Then, the codebook update section 508c updates the base codebook corresponding to the power control matrix Sx, and then, the precoding weight selecting section 508d selects optimal precoding weights of the updated codebook according to the PMI, and outputs the precoding weights to the precoding multiplying section 507. In addition, when the power control matrix generating section 508b generates the power control matrix Sx including the reciprocals of path losses in matrix elements as described above, the reciprocals of path losses are estimated from the ratio between the average reception power feedback value Sm and transmission power in each of the transmission antennas TX#1 to TX#$N_{TX}$.

The transmission signal with the phase and/or amplitude shifted in the precoding multiplying section 507 is subjected to inverse fast Fourier transform in inverse fast Fourier transform sections 509#1 to 509#$N_{TX}$, and the signal in the frequency domain is thereby transformed the signal in the time domain. Then, cyclic prefix adding sections 510#1 to 510#$N_{TX}$ add the prefix.

The transmission signals with the prefix added are output to RF transmission circuits 511#1 to 511#$N_{TX}$, subjected to frequency conversion processing for converting into the radio frequency band, and then, are transmitted to the mobile station apparatus 200 in downlink via the transmission antennas TX#1 to TX#$N_{TX}$.

A configuration of the mobile station apparatus 200 according to this Embodiment will be described below with reference to FIG. 6. In the mobile station apparatus 200 as shown in FIG. 6, transmission signals transmitted from the base station apparatus 100 are received in reception antennas RX#1 to RX#$N_{RX}$, are divided electrically into a transmission path and a reception path in duplexers 601#1 to 601#$N_{RX}$, and then, output to RF reception circuits 602441 to 602#$N_{RX}$. Then, the RF reception circuits 602#1 to 602#$N_{RX}$ perform frequency conversion processing for converting from a radio-frequency signal into a baseband signal, and then, CP removing sections 603#1 to 603#$N_{RX}$ remove the cyclic prefix added to the reception signal to output to fast Fourier transform sections (FFT sections) 604#1 to 604#$N_{RX}$.

A reception timing estimating section 605 acquires the reception signals output from the RF reception circuits 602#1 to 602#$N_{RX}$, and estimates reception timing (FFT processing timing) from reference signals included in the reception signals, for example, to notify FFT sections 604#1 to 604#$N_{RX}$. The FFT sections 604#1 to 604#$N_{RX}$ perform Fourier transform on the reception signals from the RF reception circuits 602#1 to 602#$N_{RX}$ corresponding to reception timing notified from the reception timing estimating section 605, thereby transform the time-series signal into the signal in the frequency domain, and then, output the signals to a data channel signal dividing section 606.

The data channel signal dividing section 606 divides the reception signals input from the FFT sections 604#1 to 604#$N_{RX}$, for example, by the Maximum Likelihood Detection (MLD) signal division method. By this means, the reception signals transmitted from the base station apparatus 100 are divided into reception signals associated with streams #1 to #$N_{stream}$. A channel estimation section 607 estimates the channel states from the reference signals included in the reception signals output from the FFT sections 604#1 to 604#$N_{RX}$, and notifies the data channel dividing section 606 of the estimated channel states. The data signal dividing section 606 divides the reception signals by the MLD signal dividing method, based on the notified channel states.

The reception signals associated with streams #1 to #$N_{stream}$ divided in the channel signal dividing section 606 are demapped in a subcarrier demapping section, not shown, thereby restored to the time-series signal, and data-demodulated in a data demodulation section, not shown. Then, a channel decoding section 608 performs channel decoding processing on the signal, and the transmission signal is thereby reproduced.

The average reception power measuring section 609 measures average reception power of the transmission signal from each of the transmission antennas TX#1 to TX#$N_{TX}$ from reception states of reference signals (CSI-RS) included in the reception signals input from FFT sections 604#1 to 604#$N_{RX}$. The measured average reception power is notified to a power control matrix generating section 610b of a precoding weight determining section 610, described later, as the average reception power feedback value Sm, while being notified to an uplink control signal generating section, not shown. The average reception power feedback value Sm is included in an uplink control signal (PUCCH) generated in the uplink control signal generating section and transmitted (fed back) to the base station apparatus 100 in uplink. In addition, in transmitting the average reception power feedback value Sm to the base station apparatus 100 side as feedback, for example, considered are a method of transmitting an absolute value of the average reception power feedback value Sm as feedback, and another method of transmitting a difference from the average reception power feedback value Sm of the last feedback, as feedback.

The precoding weight determining section 610 is provided with a base codebook holding section 610a that holds the base codebook, the power control matrix generating section 610b that generates the power control matrix Sx corresponding to the average reception power feedback value Sm notified from the average reception power measuring section 609, a codebook update section 610c that updates precoding weights defined in the base codebook corresponding to the power control matrix, and a precoding weight selecting section 610d that selects optimal weights from among precoding weights defined in the codebook (updated codebook) updated corresponding to the reception states of the reference signals (CSI-RS) included in the reception signals input from the FFT sections 604#1 to 604#$N_{RX}$.

In the precoding weight determining section 610, upon receiving notification of the average reception power feedback value Sm from the average reception power measuring section 609, the power control matrix generating section 610b generates the above-mentioned power control matrix Sx based on the average reception power feedback value Sm. Then, the codebook update section 610c updates the base codebook according to the power control matrix Sx, and then, the precoding weight selecting section 610d selects optimal precoding weights of the updated codebook corresponding to the reception states of reference signals (CSI-RS) included in the reception signals. Then, the PMI corresponding to selected optimal precoding weights is transmitted to the base station apparatus 100 in uplink. The PMI is notified to the uplink control signal generating section, not shown, is included in an uplink control signal (PUCCH) generated in the uplink control signal generating section, and is transmitted to the base station apparatus 100 in uplink. In addition, when the power control matrix generating section 610b generates the power control matrix Sx including the reciprocals of path losses in matrix elements as described above, the reciprocals of path losses are estimated from the ratio between the average reception power feedback value Sm and transmission power in each of the transmission antennas TX#1 to TX#$N_{TX}$ in the base station apparatus 100.

The mobile station apparatus 200 having such a configuration measures average reception power of the transmission signal from each of the transmission antennas TX#1 to TX#$N_{TX}$ of the base station apparatus 100, and transmits the average reception power feedback value Sm to the base station apparatus 100 as feedback, while generating the power control matrix Sx reflecting the value Sm. Then, after updating the base codebook with the power control matrix Sx, the apparatus 200 selects optimal precoding weights of the updated codebook, and transmits the PMI corresponding thereto to the base station apparatus 100 as feedback.

According to the mobile station apparatus 200 according to this Embodiment, optimal precoding weights are selected based on the average reception power of the transmission signal from each of the transmission antennas TX#1 to TX#$N_{TX}$ of the base station apparatus 100, the PMI corresponding to the precoding weights is transmitted to the base station apparatus 100 as feedback, it is thereby possible to provide, to the base station apparatus 100, the PMI reflecting the average reception power of the transmission signal from each of the transmission antennas TX#1 to TX#$N_{TX}$, and it is thus possible to simplify the processing in controlling transmission power of each transmission signal in the base station apparatus 100.

Meanwhile, in the base station apparatus 100, upon receiving feedback of the average reception power feedback value Sm and PMI from the mobile station apparatus 200, the power control matrix Sx reflecting the average reception power feedback value Sm is generated, and the base codebook is updated with the power control matrix Sx. Then, optimal precoding weights of the updated codebook are selected according to the aforementioned PMI, and transmission signals associated with respective streams are multiplied by the precoding weights and transmitted to the mobile station apparatus 200.

According to the base station apparatus 100 according to this Embodiment, the precoding weight to multiply a transmission signal associated with each stream is adjusted corresponding to the power control matrix Sx generated based on the average reception power of the transmission signal from each of the transmission antennas TX#1 to TX#$N_{TX}$, and transmission power of the transmission signal associated with each stream is controlled. By this means, since transmission power of the transmission signal associated with each stream is determined corresponding to the average reception power of the transmission signal from each of the transmission antennas TX#1 to TX#$N_{TX}$, it is possible to control the transmission power of the transmission signal associated with each stream flexibly while reflecting the average reception power of the transmission signal from each of the transmission antennas TX#1 to TX#$N_{TX}$, and it is thereby possible to suppress deterioration of throughput characteristics in the entire system even when a plurality of transmission antennas is placed in an indoor environment.

Particularly, in the base station apparatus 100 according to this Embodiment, feedback of the average reception power feedback value Sm is received from the mobile station apparatus 200, the power control matrix Sx is generated corresponding to the average reception power feedback value Sm, it is thereby possible to generate the power control matrix Sx common to the mobile station apparatus 200, and it is thus possible to obtain the same updated codebook from the common base codebook in both of the apparatuses with reliability. Further, the base station apparatus 100 selects optimal precoding weights from the updated codebook according to the PMI transmitted from the mobile station apparatus 200 as feedback, and is thereby capable of reliably selecting the same precoding weights as the mobile station apparatus 200.

For example, in the case of using the power control matrix Sx including the average reception power values in matrix elements, high transmission power is assigned to the transmission signal from the transmission antenna with a small path loss, as compared with the transmission signal from the transmission antenna with a large path loss, it is thereby possible to reliably transmit the transmission signal from the transmission antenna with a small path loss to the mobile station apparatus 200, it is thus possible to perform signal transmission more efficiently as compared with the case where the difference occurs in the path loss corresponding to the distance between each of the transmission antennas TX#1 to TX#$N_{TX}$ and the mobile station apparatus UE, and it is possible to suppress deterioration of throughput characteristics in the entire system.

Meanwhile, in the case of using the power control matrix Sx including the reciprocals of path losses in matrix elements, adjustments are made so that transmission power assigned to the transmission signal from the transmission antenna with a small path loss is substantially equal to transmission power assigned to the transmission signal from the transmission antenna with a large path loss, it is thereby possible to make the situation, in which the mobile station apparatus UE side is not able to obtain the transmission signal from the transmission antenna with a large path loss, hard to occur, it is thus possible to perform signal transmission more efficiently as compared with the case where the difference occurs in the path loss corresponding to the distance between each of the transmission antennas TX#1 to TX#$N_{TX}$ and the mobile station apparatus UE, and it is possible to suppress deterioration of throughput characteristics in the entire system.

Further, the power control matrix Sx is comprised of a diagonal matrix (herein, the eighth-order diagonal matrix) having the dimension of the number of transmission antennas of the base station apparatus 100, and has average reception power values (or the reciprocals of path losses based on the average reception power values) from respective transmission antennas TX#1 to TX#$N_{TX}$ in diagonal components of matrix elements. Therefore, it is only essential that the mobile station apparatus 200 performs feedback of the diagonal components (for example, eight diagonal components, when the number of transmission antennas is "8") of matrix elements of the power control matrix Sx, as the feedback information required for the base station apparatus 100 to generate the power control matrix Sx, and the need is thereby eliminated for reserving the high number of information bits for the feedback information to generate the power control matrix Sx.

For example, as similar techniques to support the difference in the path loss between transmission signals caused by the position relationship between a plurality of transmission antennas and the mobile station apparatus UE, it is proposed restricting transmission of a transmission signal from a particular transmission antenna, using a codebook defining a component (i.e. "0" component) to set transmission power of a transmission signal at off as a precoding weight (3GPP, TR36.814, "Further Advancements for E-UTRA: Physical Layer Aspects"). In the case of using such a codebook, it is possible to switch on/off the transmission power of a transmission signal from a particular transmission antenna. However, it is necessary to increase the number of precoding weights defined in the codebook corresponding to the number of transmission antennas, and the feedback information amount required to identify the precoding weights increases, as the number of antennas increases, particularly. In contrast thereto, in the mobile communication system 1000 according to this Embodiment, it is required to perform feedback of only diagonal components of matrix elements of the power control matrix Sx from the mobile station apparatus 200, and it is thus possible to significantly reduce the feedback information amount from the mobile station apparatus 200 to the base station apparatus 100.

In addition, the above-mentioned descriptions describe the case where a plurality of transmission antennas is distributed and placed and the path loss of the transmission signal thereby occurs, as a specific example, but the application target of the invention is not limited to the case where a plurality of transmission antennas is distributed and placed. For example, it is possible to apply the invention also to the case where a plurality of transmission antennas is locally placed (Localized placement) and the difference occurs in the path of the transmission signal, the case where vertical/horizontal polarization antennas are used and the reception level difference varies between the vertical polarization surface and the horizontal polarization surface, etc.

In the above-mentioned descriptions, the invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2009-231924 filed on Oct. 5, 2009, entire content of which is expressly incorporated by reference herein.

The invention claimed is:

1. A base station apparatus comprising:
a power control matrix generating section configured to generate a power control matrix reflecting average reception power of each of transmission signals from a plurality of transmission antennas;
an update section configured to update a codebook which beforehand defines a plurality of precoding weights corresponding to the power control matrix;
a selecting section configured to select precoding weights that maximize throughput or
reception SINR obtained after combining the transmission signals from the updated codebook; and
a transmission power control section configured to control transmission power of each of the transmission signals corresponding to the precoding weights selected in the selecting section,
wherein the power control matrix generating section generates the power control matrix which is a diagonal matrix having the dimension corresponding to the number of transmission antennas, and has average reception power values of the transmission signals from respective transmission antennas in diagonal components of matrix elements, and
wherein, when transmission power of a transmission signal determined by the precoding weights selected in the selecting section falls below a predetermined threshold, the transmission power control sections sets the transmission power of the transmission signal at "0".

2. The base station apparatus according to claim 1, further comprising:
a reception section configured to receive information on the average reception power and on selected precoding weights from a mobile station apparatus which measures the average reception power from the transmission signal of each of the transmission antennas, generates the power control matrix reflecting the average reception power, updates a plurality of beforehand defined precoding weights corresponding to the power control matrix, and selects precoding weights that maximize throughput or reception SINR obtained after combining the transmission signals from the updated precoding weights,
wherein the power control matrix generating section generates the power control matrix corresponding to the average reception power measured in the mobile station apparatus, and the selecting section selects precoding weights corresponding to the information on the precoding weights selected in the mobile station apparatus.

3. A base station apparatus comprising:
a power control matrix generating section configured to generate a power control matrix reflecting average reception power of each of transmission signals from a plurality of transmission antennas;
an update section configured to update a codebook which beforehand defines a plurality of precoding weights corresponding to the power control matrix;
a selecting section configured to select precoding weights that maximize throughput or
reception SINR obtained after combining the transmission signals from the updated codebook; and
a transmission power control section configured to control transmission power of each of the transmission signals corresponding to the precoding weights selected in the selecting section,
wherein the power control matrix generating section generates the power control matrix which is a diagonal matrix having the dimension corresponding to the number of transmission antennas, and has values calculated on attenuation amounts of the transmission signals from respective transmission antennas in diagonal components of matrix elements.

4. A mobile station apparatus comprising:
an average reception power measuring section configured to measure average reception power of each of transmission signals from a plurality of transmission antennas of a base station apparatus;
a power control matrix generating section configured to generate a power control matrix reflecting the average reception power;
an update section configured to update a codebook which beforehand defines a plurality of precoding weights corresponding to the power control matrix;
a selecting section configured to select precoding weights that maximize throughput or reception SINR obtained after combining the transmission signals from the updated codebook; and
a transmission section configured to transmit, to the base station apparatus, information on the average reception power measured in the average reception power measuring section and on the precoding weights selected in the selecting section,
wherein the power control matrix generating section generates the power control matrix which is a diagonal matrix having the order corresponding to the number of transmission antennas, and has values calculated on attenuation amounts of the transmission signals from respective transmission antennas in diagonal components of matrix elements.

5. A mobile communication system in which transmission signals are transmitted from a plurality of transmission antennas of a base station apparatus by spatial multiplexing transmission, and a mobile station apparatus divides the transmission signals to obtain a reception signal, comprising:
the mobile station apparatus having an average reception power measuring section configured to measure average reception power of each of the transmission signals from the plurality of transmission antennas;
a first precoding weight determining section configured to generate a power control matrix reflecting the average reception power, to update a plurality of beforehand defined precoding weights corresponding to the power control matrix, and to select optimal precoding weights from the updated precoding weights; and
a transmission section configured to transmit, to the base station apparatus, information on the average reception power and on the optimal precoding weights; and
the base station apparatus having a second precoding weight determining section configured to generate a power control matrix reflecting the average reception power transmitted from the mobile station apparatus, to update a plurality of beforehand defined precoding weights corresponding to the power control matrix, and to select optimal precoding weights from the updated precoding weights corresponding to the information on the optimal precoding weights transmitted from the mobile station apparatus; and
a transmission power control section configured to control transmission power of each of the transmission signals corresponding to the precoding weights selected in the second precoding weight determining section,
wherein the first and second precoding weight determining sections generate the power control matrix which is a diagonal matrix having the order corresponding to the number of transmission antennas of the base station apparatus, and has values calculated on attenuation amounts of the transmission signals from respective transmission antennas in diagonal components of matrix elements.

6. A transmission power control method in a base station apparatus for transmitting transmission signals from a plurality of transmission antennas to a mobile station apparatus by spatial multiplexing transmission, comprising:
in the mobile station apparatus,
measuring average reception power of each of the transmission signals from the plurality of transmission antennas;
generating a power control matrix reflecting the average reception power, updating a plurality of beforehand defined precoding weights corresponding to the power control matrix, and selecting optimal precoding weights from the updated precoding weights; and
transmitting, to the base station apparatus, information on the average reception power and on the optimal precoding weights; and
in the base station apparatus,
generating a power control matrix reflecting the average reception power transmitted from the mobile station apparatus, updating a plurality of beforehand defined precoding weights corresponding to the power control matrix, and selecting optimal precoding weights from the updated precoding weights corresponding to the information on the optimal precoding weights transmitted from the mobile station apparatus; and
controlling transmission power of each of the transmission signals corresponding to the selected optimal precoding weights,
wherein the base station apparatus and the mobile station apparatus generate the power control matrix which is a diagonal matrix having the dimension corresponding to the number of transmission antennas of the base station apparatus, and has values calculated on attenuation amounts of the transmission signals from respective transmission antennas in diagonal components of matrix elements.

7. The base station apparatus according to claim 3, wherein the values calculated on attenuation amounts are the reciprocals of attenuation amounts and values in proportion thereto.

* * * * *